Oct. 9, 1945.    J. A. LAUCK    2,386,219
MULTIPLE UNIT COMPACT GEAR DIVIDER ASSEMBLY
Filed April 15, 1943    6 Sheets-Sheet 3
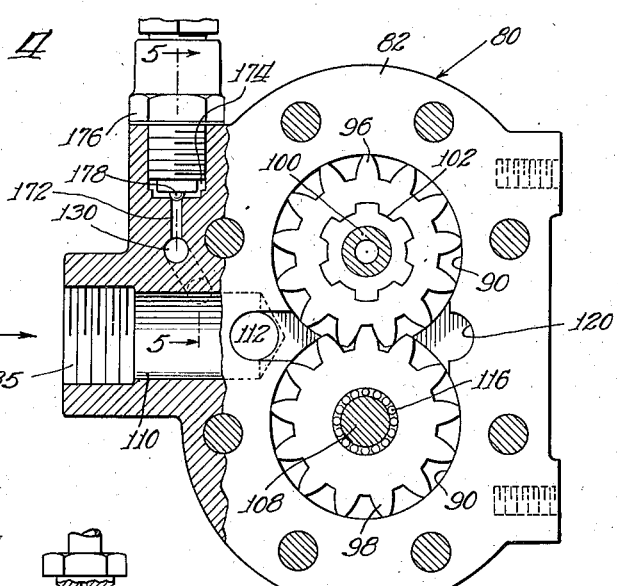
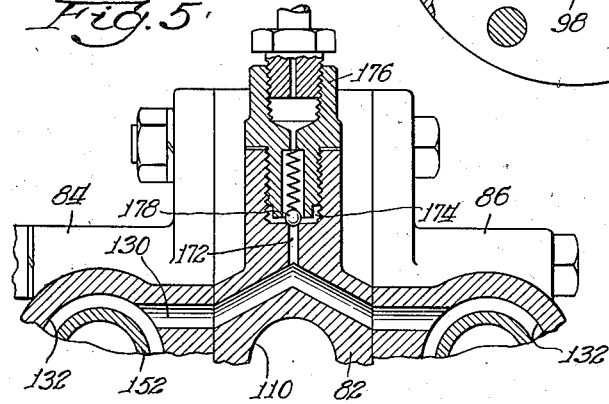
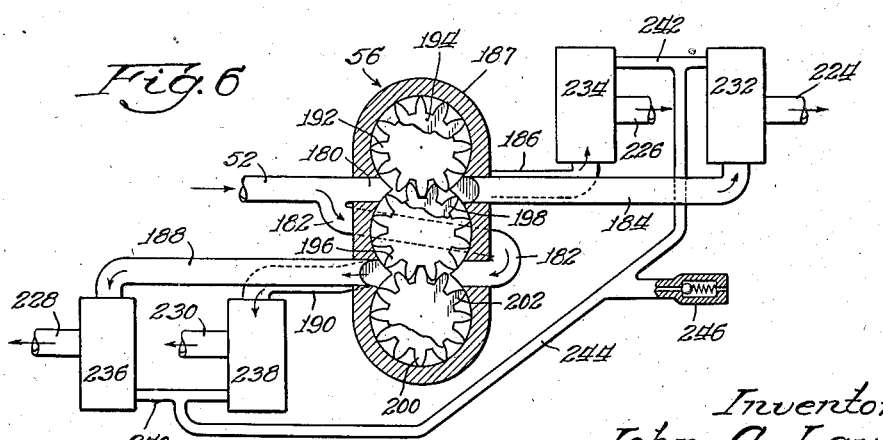

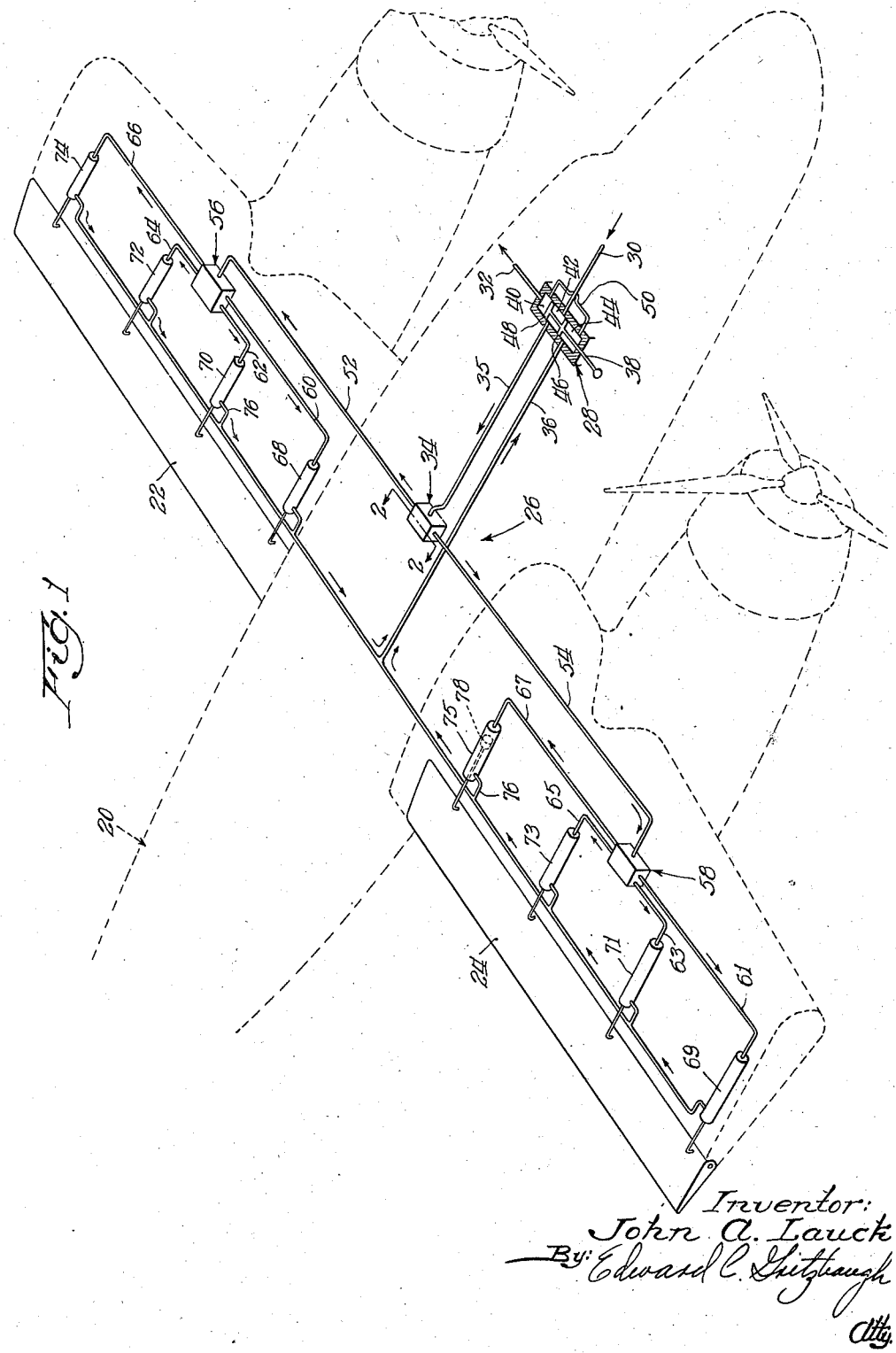

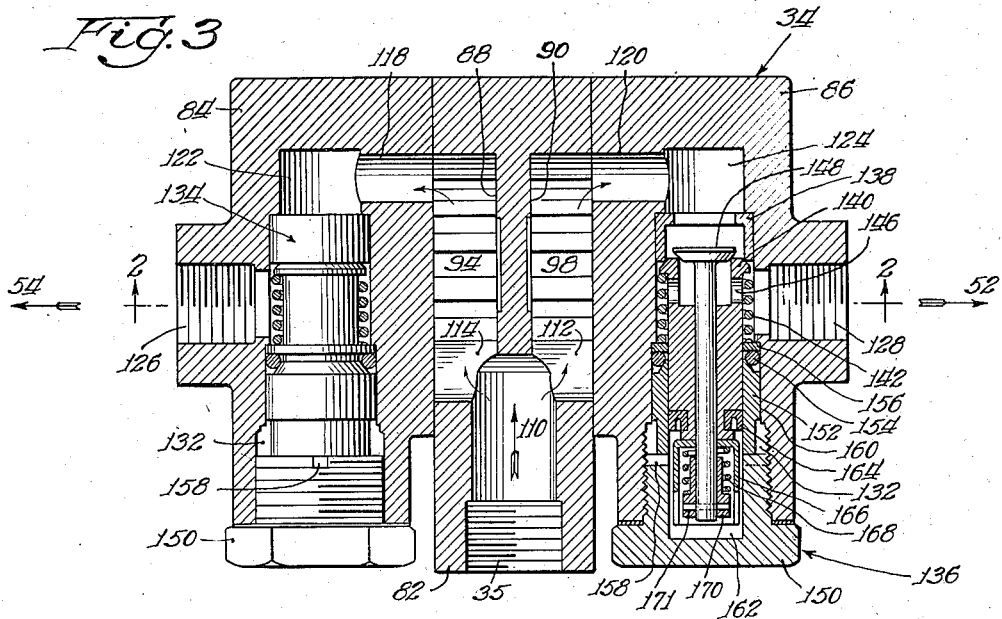

Oct. 9, 1945.  J. A. LAUCK  2,386,219
MULTIPLE UNIT COMPACT GEAR DIVIDER ASSEMBLY
Filed April 15, 1943  6 Sheets-Sheet 4
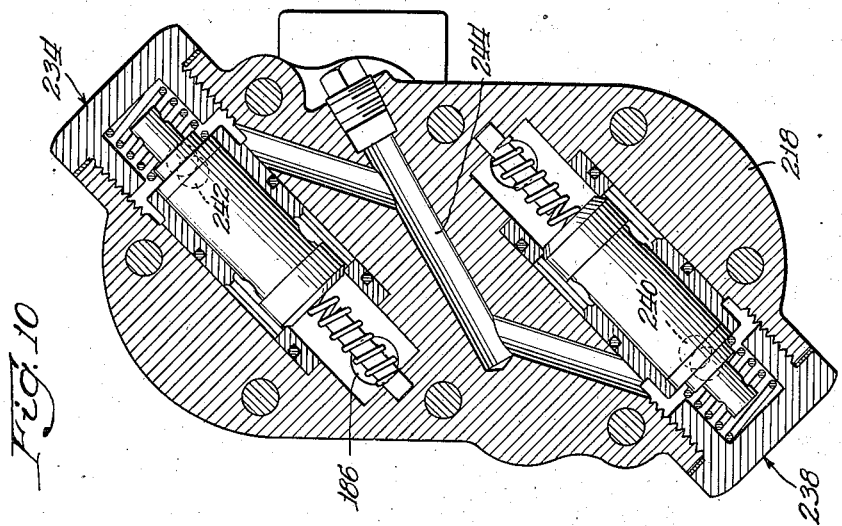
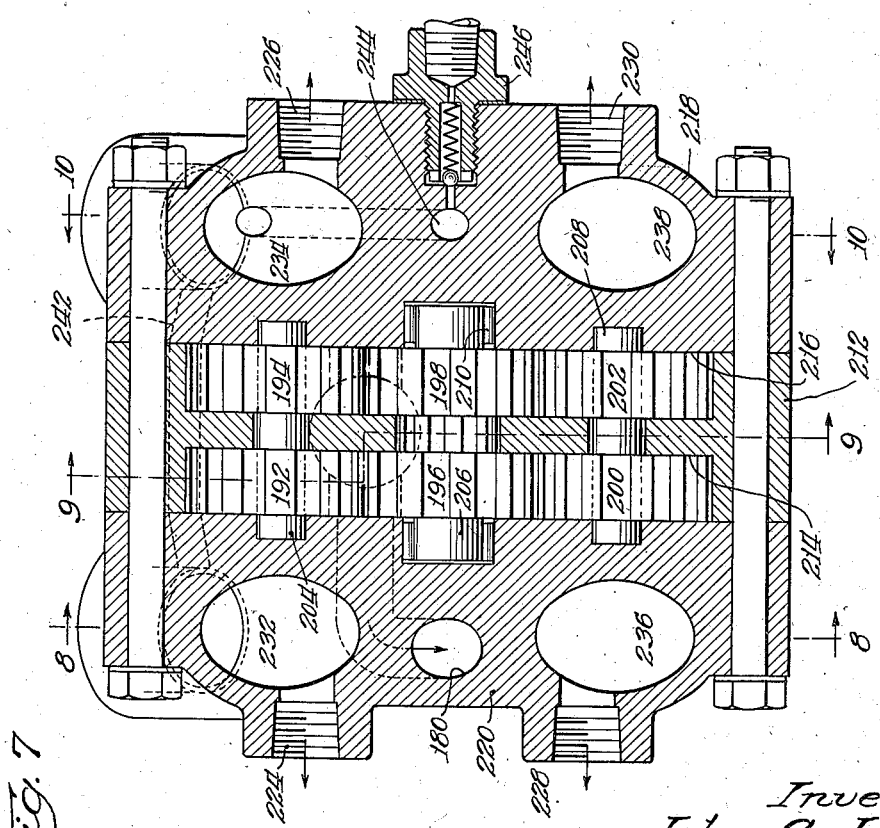
Inventor:
John A. Lauck
By: Edward C. Fitzbaugh Oct. 9, 1945.    J. A. LAUCK    2,386,219
MULTIPLE UNIT COMPACT GEAR DIVIDER ASSEMBLY
Filed April 15, 1943    6 Sheets-Sheet 5
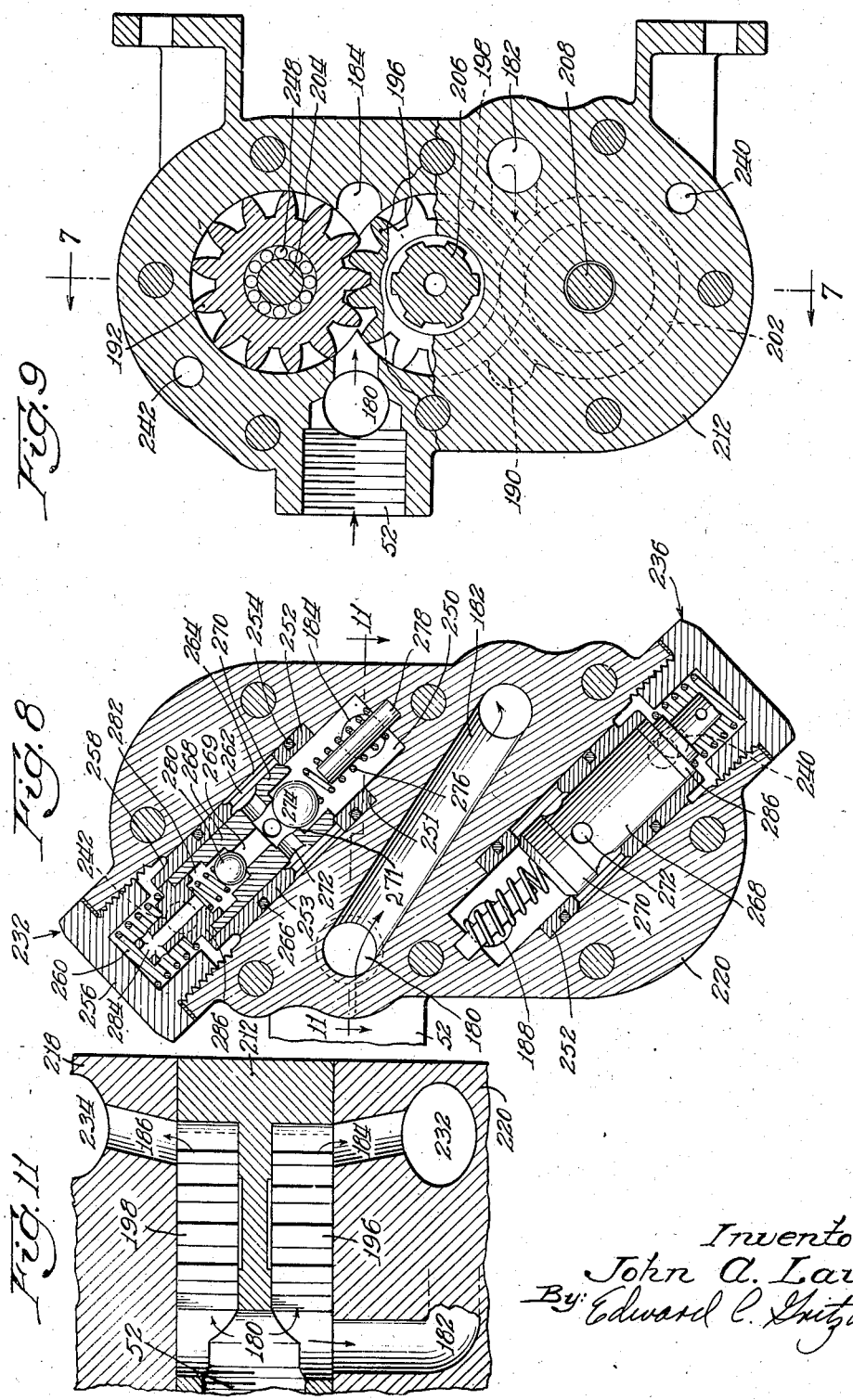

Oct. 9, 1945.  J. A. LAUCK  2,386,219
MULTIPLE UNIT COMPACT GEAR DIVIDER ASSEMBLY
Filed April 15, 1943  6 Sheets-Sheet 6
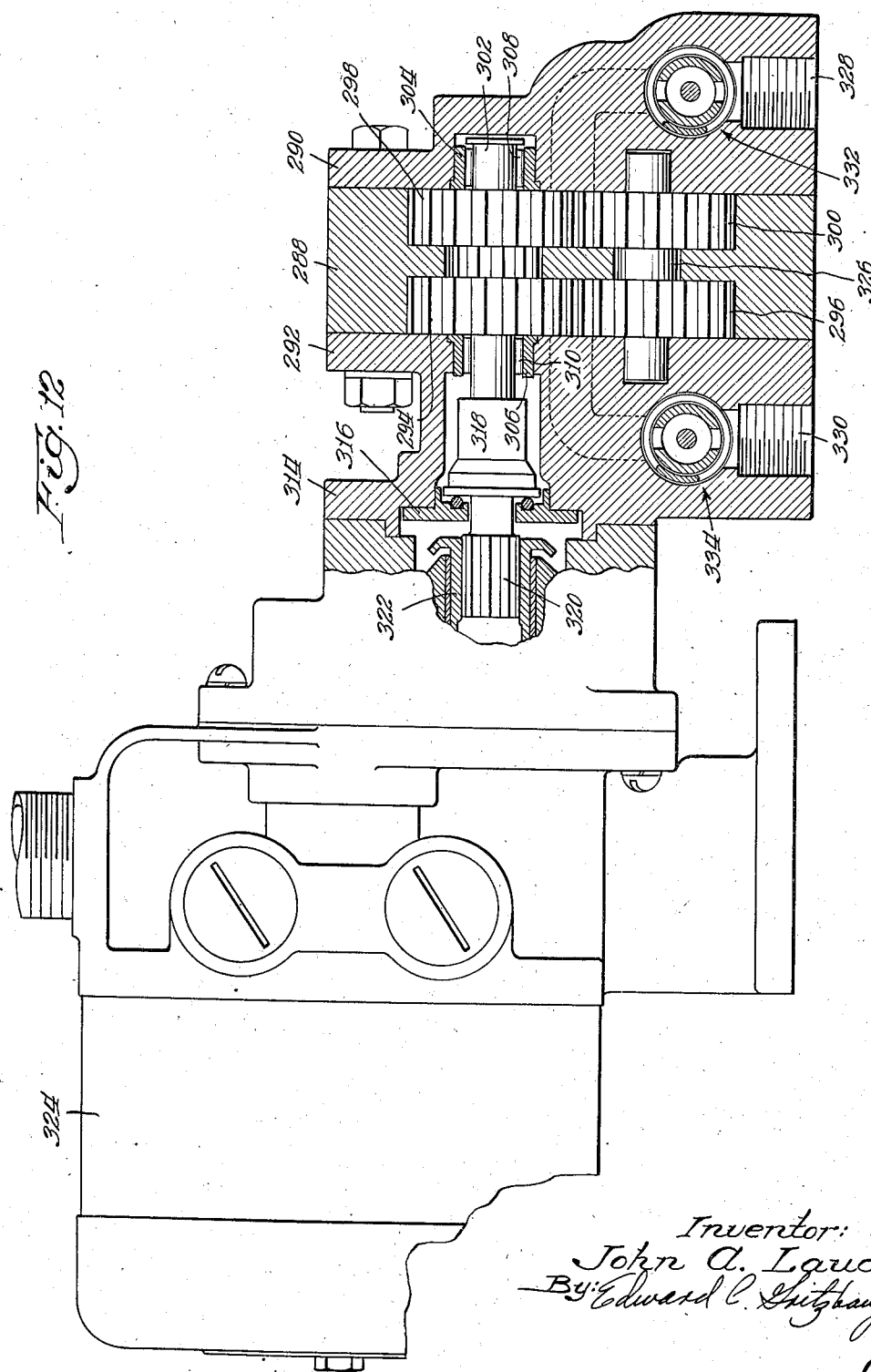
Inventor:
John A. Lauck
By: Edward C. Fitzhaugh
Atty.

Patented Oct. 9, 1945

2,386,219

UNITED STATES PATENT OFFICE 2,386,219

MULTIPLE UNIT COMPACT GEAR DIVIDER ASSEMBLY

John A. Lauck, South Euclid, Ohio, assignor to Pesco Products Co., Cleveland, Ohio, a corporation of Ohio Application April 15, 1943, Serial No. 483,119

9 Claims. (Cl. 103—11)

This invention is a continuation-in-part of the application of John A. Lauck, Serial No. 314,209, now Patent No. 2,343,912, March 14, 1944, and relates to a fluid system and the like. More particularly, this invention relates to improved means for equalizing the flow of fluid to a plurality of remotely located hydraulically operated units.

It is a principal object of this invention to disclose an improved means for synchronizing the movement of a plurality of remotely located fluid pressure operated instrumentalities. In this connection, it is an object to provide an improved means for dividing and metering a flow of fluid between a plurality of instrumentalities to be operated, so that they may be operated in a constantly maintained relationship regardless of possible varying operating conditions, and irrespective of whether one of the said instrumentalities has a greater pressure or drag thereon than the other or others.

It has been found that fixed displacement fluid pumps, especially of the so-called gear type, vary their output flow somewhat in relation to the resistance to flow exerted on the output of said pump. This variation in output flow is of serious consequence in the case where a plurality of instrumentalities are to be operated in synchronism, such, for example, as is the case in operating the wing flaps or landing gears of an airplane. A difference in flow to a fluid motor of one wing flap as compared to the other may throw an airplane out of balance, with serious consequences. It is necessary, therefore, to provide means compensating for and adjusting any difference in the ratio of flow, whereby such instrumentalities will be automatically maintained in correct synchronism, and it is an object of this invention to disclose an improved means accomplishing this purpose.

In connection with the above, it is an object to provide, in connection with a fluid moving flow divider which has a plurality of outlets and which varies the amount of fluid moved from any one outlet in relation to the resistance to flow of any such outlet, means responsive to such resistance in flow in one outlet, which varies the resistance in the other outlet or outlets whereby the resistance in all outlets are substantially proportional or identical at all times.

It is another object to provide an assembly for accomplishing the synchronized operation of a plurality of remotely located, independently operable devices; in this connection it is an object to provide a device which is relatively simple to manufacture, is comparatively compact and inexpensive, and one which is easily serviced and operated.

It is a further object of this invention to provide a fluid moving flow divider for operating a plurality of synchronized instrumentalities, which flow divider may be actuated by the pressure of the inlet stream or may be driven by power means such as an electric motor, or both. It is particularly an object to disclose an improved device operable from a source of power such as an electric motor.

It is a further object of the invention to provide a system for accomplishing the above-mentioned purposes, in which there is provided an improved throttling valve arrangement in connection with a fluid dividing and moving means, and wherein the throttling valve arrangement assures correct amount of fluid flow to each of the instrumentalities to be operated.

It is another object to provide an arrangement in which a fluid moving flow divider has a single inlet and a plurality of discharge outlets or conduits, each of which discharge conduits in turn has a second fluid moving flow divider, with a plurality of discharge conduits thereon, and as an alternative construction an improved means for boosting the flow from each divider.

It is a further and important object of this invention to combine what may be termed the fluid moving gear divider unit and the back pressure equalizer valve assembly in a single housing in a novel and compact manner.

It is a purpose to disclose an improved back pressure equalizing valve assembly incorporating ball type check valves, which arrangement is advantageous over other means which are employed in similar situations, and in addition which ball type valve eliminates the need for the use of at least one flexible seal for each valve, said seal being usually composed of rubber or a synthetic product, or other very scarce materials.

It is a further object to provide a novel assembly in which the fluid stream is divided once, and each of the resultant streams is in turn divided into four streams by a novel combination of compact flow dividers, occupying comparatively little space and suitable for installation on such devices as aircraft.

It is a still further object to disclose a gear type fluid moving flow divider in which there are less sets of gears than there are outlet streams, for example, in which three sets of gears comprising two groups of three gears each, have four outlet streams.

Other objects, the advantages and uses of the invention will become more apparent after reading the following specification and claims, and after consideration of the drawings forming a part of the specification, wherein:

Fig. 1 is a schematic diagram, showing the device of the present invention as applied to an airplane of conventional design, for the purpose of operating the wing flaps thereof;

Fig. 2 is an elevational cross-sectional view taken on the line 2—2 of Figs. 1 and 3, looking in the direction of the arrows, and showing a device which may be termed a gear type two-way fluid moving flow divider;

Fig. 3 is a horizontal cross-sectional view taken on the line 3—3 of Fig. 2, looking in the direction of the arrows;

Fig. 4 is a vertical elevational view, partially in cross-section, taken on the line 4—4 of Fig. 2, looking in the direction of the arrows;

Fig. 5 is a fragmentary cross-sectional view taken on the line 5—5 of Fig. 4, looking in the direction of the arrows;

Fig. 6 is a view of what may be termed a gear type four-way fluid moving flow divider, showing schematically the arrangement of fluid circuits in said divider;

Fig. 7 is a longitudinal, elevational sectional view of the four-way fluid moving flow divider shown as part of schematic Fig. 6, the view being taken on the line 7—7 of Fig. 9, looking in the direction of the arrows;

Fig 8 is a cross-sectional, elevational view taken on the line 8—8 of Fig. 7, looking in the direction of the arrows;

Fig. 9 is a cross-sectional, elevational view, taken on the line 9—9 of Fig. 7, looking in the direction of the arrows;

Fig. 10 is a cross-sectional elevational view taken on the line 10—10 of Fig. 7, looking in the direction of the arrows;

Fig. 11 is a fragmentary, horizontal, cross-sectional view, taken on the line 11—11 of Fig. 8, looking in the direction of the arrows; and Fig. 12 is a fragmentary, partial sectional view showing a fluid moving flow divider driven by a power means such as an electric motor.

Referring more in detail to the construction shown in the various figures, and referring first to Fig. 1, the present invention has been indicated as applied to an aircraft of conventional design for the purpose of operating the wing flaps thereon. It will be understood that while this application of the invention is a particularly advantageous one, it may be considered primarily illustrative, and the invention is adaptable to many other uses.

The airplane 20 shown in dotted lines, is provided with the wing flaps 22 and 24. These wing flaps 22 and 24 are operated by means of what may be termed a hydraulic system indicated generally by the numeral 26. This system is schematically illustrated in Fig. 1.

It comprises, in the combination and arrangement herein shown, a control means herein referred to as control 28, located within the cabin of an airplane, or otherwise, as may be convenient, with an inlet conduit 30 leading from an accumulator or a pump (not shown), and an outlet 32 to a storage tank or the like (not shown).

The control means is likewise provided with two other conduit means, the conduit 35 which lies between the control means and the inlet of a two-way flow divider 34, and a second conduit 36, hereinafter termed reverse conduit, described more in detail later herein.

The control 28 is shown as provided with valve element 38, which segregates the interior of the control means into what may be termed sections 40, 42 and 44, sections 40 and 44 varying in size with the movement of the valve 38, and section 42 varying in position with the movement of the valve 38, section 42 being located between sections 40 and 44.

The valve 38 is provided with cross members 46 and 48 of sufficient width in cross-section to cover the openings respectively, of return conduit 36 and conduit 35. The conduits 36 and 35 ordinarily enter the control valve means at spaced intervals. The partitions 46 and 48 are spaced apart a distance equal to the spacing of the conduits 35 and 36. This permits the partitions 46 and 48 to be moved into a position which entirely blocks and closes off the openings of said conduits, thereby locking the device in position so that the fluid is static and all of the parts in the system are retained against movement which would change the position of the wing flaps.

The inlet conduit 30 is preferably positioned to open into the section 42, regardless of the position of the partitions 46 and 48. The partitions 46 and 48 may be actuated by any convenient means, such as by a lever or by a solenoid arrangement.

There is provided a by-pass 50, connecting the end sections 40 and 44 together, said by-pass entering each section between the respective conduit 35 or 36, and the end of the housing. This by-pass 50 allows fluid entering the section 44 from conduit 36 to flow into the section 40 from where it is withdrawn by means of the outlet conduit 32, and may be returned to the tank or accumulator.

The conduit 35 is shown in Fig. 1 as leading from the section 42. However, by movement of the partition 48, this conduit 35 may be either blocked or brought into communication with the section 40. In the latter event, the fluid in conduit 35 would reverse its direction of flow and would discharge into the section 40 from whence it would be withdrawn through the outlet 32.

Connecting with the fluid moving flow divider 34, pipes 52 and 54 conduct fluid between it and the four-way fluid moving flow dividers 56 and 58 respectively.

It is understood that the arrangement shown here involving a two-way divider 34, and a pair of four-way dividers, 56 and 58, is very advantageous for the operation of the wing flaps of an airplane such as is illustrated in the Fig. 1. However, for other purposes, or for other arrangements of the same purpose, the number of outlets in the dividers may be different, and the showing here illustrates the principle involved.

The flow divider 56 is shown as provided with four outlets 60, 62, 64 and 66, leading to the flap operating piston type fluid motors 68, 70, 72 and 74 respectively. Likewise, the four-way fluid moving flow divider 58 is shown as having the four outlets 61, 63, 65 and 67, leading to the piston type fluid motors 69, 71, 73 and 75 respectively. These correspond to the outlets and fluid motors in connection with the four-way fluid moving flow divider 56.

The details of construction of the fluid motor 75 used here for illustration are shown in dotted lines, but any form of suitable device may be used.

In the arrangement shown, all of the fluid motors 68, 69, 70, 71, 72, 73, 74 and 75 have leads 76 connecting to the reverse conduit 36. While it is not necessary in the disclosure hereof, dividers and equalizers may be inserted in the return conduit.

In normal operation all of these conduits above-described as well as the dividers, control means, etc., are normally filled with fluid under pressure. Control of the fluid motors and hence the wing flaps, is obtained by moving the fluid back and forth in the system so that the position of the pistons 78 in the fluid motors will be varied under the pressure differentials developed in such movement.

Referring next to the improved gear type two-way fluid moving flow divider 34, illustrated in detail in Figs. 2, 3, 4 and 5, there is provided a housing indicatd in its entirety by the numeral 80, which for ease and facility in manufacturing and servicing consists of the partition or center plate 82, and the covers or sides 84 and 86. The center plate 82 is provided with the overlapping gear wheel receiving bores or recesses 88 and 90, into which are placed the gears comprising the gear wheels 92, 94, 96 and 98, the first two gear wheels meshing and the second two gear wheels meshing in the well known manner of gear pumps. Each pair of gear wheels on the same shaft is usually referred to herein as a "set" of gear wheels.

The gear wheels (see Figs. 2 and 4) 92 and 96 are preferably provided with the same axle 100 to which they may be splined or otherwise attached so as to be driven together. The axle 100 is shown as provided with the splines 102 which accomplishes the purpose of holding the gear wheels 92 and 96 in synchronism. These splines 102 eliminate the necessity of attaching the axle 100 to the gear wheels 92 and 96, since the splines 102 assure the rotation of the gear wheels 92 and 96 together. The axle 100 is provided with bushings 104, and may be journaled to rotate on bearings 106, in the well known manner of devices of this type. This axle 100 may be provided with means for motor driving in the manner of the device of Fig. 12.

The gear wheels 94 and 98 are carried by an axle 108, on which they are journaled, and to which axle it is not necessary to attach or spline the wheels. Preferably, bearings 116 are inserted between the gear wheels 94, 98 and the axle 108. The gear wheel 94 will mesh with the gear wheel 92 and the gear wheel 98 will mesh with the gear wheel 96, and it is thus assured that they will be rotated in synchronism.

Referring next primarily to Figs. 3 and 4, although occasional reference is made to Figs. 2 and 5, the inlet chamber 110 is shown as located in the center plate 82, which inlet chamber is provided with openings or ports 112 and 114, one of which (114) leads to the recess 88 on the inlet side of the gear wheels 92 and 94, and the other of which (112) leads to recess 90 for gear wheels 96 and 98. This inlet chamber 110 connects to the conduit 35 (see Fig. 1), and fluid from said conduit is carried through said inlet chamber 110 to the recesses for the gear wheels, or—in the event of reversal of operation—is carried from the gear wheels to the conduit 35. The partition or center plate 82 acts as a divider whereby the fluid is divided into two streams as it flows from the conduit 35 into the two ports 112 and 114.

The recesses 88 and 90 are each provided with an outlet port, the port 118 entering the recess 88, and the port 120 entering recess 90, which ports conduct the fluid from the respective gear wheel groups or in reversing operation, to the gear wheels. The port 118 leads to the valve chamber 122, and the port 120 leads to the valve chamber 124.

Located in each of these valve chambers 122 and 124 are means comprising what may be termed a throttling or equalizing valve, by which the amount of fluid pumped by each group of gear wheels is regulated and metered with respect to the amount pumped by any other group in the device. The valve chamber 122 has a discharge port 126, and the valve chamber 124 has a discharge port 128. The discharge port 126 connects to the pipe 54 above described, and the discharge port 128 connects to the pipe 52 above described. The valve chambers 122 and 124 are connected together by means of a channel 130, preferably at a position approximately at 132 where an annulus is formed in each valve chamber.

The valve chambers 122 and 124 as above mentioned each contain what may be termed throttling valves or equalizing valves, valve chamber 122 having the throttling valve 134, and the valve chamber 124 containing the throttling valve 136. It is very desirable that these valves be located in the same housing as the gear pump. They are interconnected hydraulically through the passage 130 as above described, so that a compact and efficient fluid moving flow dividing and metering means results. Since the construction of these two valves is identical, a description of one is all that is necessary here.

Accordingly, referring to the throttling valve 136, as particularly illustrated in Fig. 3, there is provided the cup 138 which is seated against a shoulder formed in the wall of the valve chamber 124, adjacent the outlet port 120. This cup 138 has an opening in what may be termed its bottom which communicates with the outlet port 120. At the portion which may be termed its top, the cup 138 forms a valve seat against which the head of the valve 140 is urged by the spring 142.

The valve 140 comprises a cylindrically shaped tubular member and has the upper or head end hollowed out to form a sub-chamber, which is open at its top to the flow of fluid to and from the cup 138, and which communicates with the discharge port 128 by means of one or more small ports 146. The head portion of the valve 140 forms a valve seat for the disc valve 148, which disc valve has a depending stem passing through the sub-chamber and bore of the valve 140, as hereinafter more fully described. The valve chambers 122 and 124 are closed by means of the plugs 150, which may have tubular skirt or side wall portions extending upwardly into the chamber 124 (as shown in Fig. 3) preferably to a position just below the port 128. Preferably the plug 150 has a portion 152 of enlarged diameter, which forms a fairly close fit with the wall of the valve chamber.

The upper end of the skirt of the plug 150 preferably forms the seat for a ring type seal 154, which bears against the washer 156. The washer 156 in turn seats against a shoulder formed inside of the valve chamber 124, and this washer 156 becomes the seat for the spring 142 which urges the head of the valve 140 against the cup 138. Preferably, also the skirt of the plug 150 is of reduced diameter as shown at 132, and forms—with the enlarged diameter bore of the valve chamber at this point—an annulus for the collection and conduction of fluid. This annulus, as will most clearly be apparent from Fig. 5, opens into the conduit 130 leading to the other valve chamber. The plugs 150 are preferably threaded into the valve chambers and if desired, a seal such as a gasket may be provided between the head of the plug 150 and the end of the housing forming the chamber.

The plug 150 likewise has a port means 158 which passes through the skirt of the plug and discharges into the annulus 132. The interior bore of the skirt of the plug 150 preferably forms a cylinder which receives the assembly comprising the valve 140 and the disc valve 148 carried thereby. This assembly above mentioned is so fitted into the skirt of the plug 150 that it is movable axially for seating and unseating the head of the valve 140 against the shoulders of the cup 138. If desired, a small clearance may be provided between the valve 140 and the wall of the cylindrical bore of the plug 150, in order that fluid under pressure may be forced between the two in rather minute quantities. This provides for the passage of some fluid from the port 128 downwardly between the walls of the plug 150 and the valve 140 at the area indicated at 160, for example, and the discharge of that fluid into the chamber 162 formed in the head end of the plug 150. A "one-way" seal 164, preferably of neoprene or other flexible material, allows this fluid to flow into the chamber 162, but prevents its return through the minute space between the walls at 160.

As above mentioned, and as is clearly apparent from Fig. 3, the valve 148 preferably has a depending stem portion which extends through the bore in the body portion of the valve 140 and depends into the chamber 162 when in assembled position. A cup-like spring seat 166 may be placed over the end of the stem of the valve 148, and between the spring 168 and the bottom of the body portion of the valve 140. The spring 168 in turn is carried on a ferrule-like member 170, which is attached to the end of the stem of the valve 148 by any convenient means such as a pin 171. Through this arrangement, the spring 168 exerts tension between the valve 148 and the valve 140, holding the valve 148 seated on the valve seat formed for that purpose on the head of the valve 140. However, where there is a reversal of the flow of fluid, the valve 148 is unseated by the force of the fluid, in which case the valve 148 will move upwardly against the pressure of the spring 168.

The valve assemblies 134 and 136 are of substantially the same construction, the valve 134 communicating with the discharge port 126, and the valve 136 communicating with the discharge port 128.

It is noted that the stem of the valve 148 has a slight clearance with respect to the bore of the valve 140 through which the said stem passes, preferably the clearance being between .0005 and .0001 of an inch, through which fluid under pressure may pass.

It is understood that in normal operations, the various passages and chambers will be substantially filled with fluid at all times, but the pressures in such fluid will vary in accordance with the drag or load on the wing flaps. It is further understood that the gears 92 and 96 may be connected to a shaft to which a source of power is attached, although such connection with a source of power is not shown in Figs. 2, 3, 4 and 5.

Ordinarily, fluid under pressure from the control means 28, is introduced through the inlet chamber 110, where it is picked up (on one side) by gears 96 and 98 and transmitted into the port 120. Preferably and supposedly, an equal portion of the fluid is picked by each of the gear sets, namely, 92, 94, 96 and 98, and transmitted into the ports 120 and 118 respectively. It has been found, however, that the amount of fluid metered by each of these gear sets will vary materially under the difference in pressure of the fluid at the outlet port 120 and at the outlet port 118. This variation is normally sufficient to throw the plane out of balance, and such variation must be compensated for or counteracted, for which purpose the throttling valves 136 and 134 are introduced.

This fluid from the outlet port 120 will pass through the cup 138 into the chamber 124, where it will exert pressure on the top of the valves 140 and 148, unseating the valve 140 and causing a downward movement of said valve (with its assembled parts as previously disclosed), the fluid flowing from the cup 138 past the valve head of the valve 140 into the discharge port 128, from where it goes to the device to be operated thereby, in this instance a four-way fluid moving flow divider 56.

In the event the pressure at the outlet port 128 is increased, as by drag on the wing flaps, there is a tendency of the head of the valve 140 to seat (in the illustrated position in Fig. 3), or at least to seat partially, so that there is a restricted flow from the pump through the cup and into the discharge port 128. In such event, it is desirable to have the valve 134 loaded likewise, so that the flow through it to the outlet 126 is identical. This is accomplished by the fluid in the outlet 128 backing up into the chamber 144 and passing down along the valve stem of the valve 148 into the chamber 162. Fluid likewise, in the event provision is so made, may pass down the sides between the valve 140 and the cylinder walls, in the area indicated at 160. This fluid, reflecting the pressure in the outlet 128, is conducted into the annulus 132 by means of the port 158.

Referring next to Fig. 5, the fluid is conducted from the annulus 132 by the channel 130, and discharged into the annulus of throttling valve chamber 134 where it exerts an upward pressure against the bottom of the companion valve 140, by filling the chamber 162 in said valve chamber 134 at the pressure of the fluid in the chamber 162 of the valve 136. This pressure moves the head of the valve 140 to a position identical with that of the same valve in the other chamber, so that substantially the same amount of fluid passes the head of the valve 140 in both units from the outlet 120. The excess fluid in the two chambers 162 will pass back into the respective outlets 126 and 128 when the unequal drag has been released. This back flow ordinarily will take place by seepage around the stem of the valve 148, although other means of evacuating it may be provided if desired.

In the event it is desired to reverse the flow of fluid in the system, manipulation of the control 28 will result in fluid in the lines 52 and 54 returning through the ports 128 and 126 respectively, will enter the small ports 146 and chamber 144, will lift the disc valve 148 from its seat on the head of the valve 140, and will pass around the said disc valve 148 into the ports 118 and 120, and flow back through the gear divider (now running in a reverse direction) into the chamber 110 and back to the control means 28. This reversal of flow will occur ordinarily where the wing flaps are returned to the normal position after having been forced into a different position by means of the flow of the divider pumps above mentioned.

Referring next to Figures 4 and 5, it is noted that the device may be provided with means for relieving excessive pressure developed by expansion of the fluid in the system, such expansion as that which may be caused by heat, for example. This comprises a small port 172, located in the housing of the device, which port connects at one end to the channel 130, and at the other end to the relief chamber 174. The chamber 174 is, in turn, preferably closed by a hollow plug 176 through which there is a small opening, and to which plug there is attached a conduit capable of carrying the very minute flow ordinarily passing through this device. This conduit may be directed back to the supply tank. Check means, such as spring pressed ball check valve 178, normally closes the discharge end of the port 172 so that only under urging of the pressure caused by fluid expansion will the valve 178 be unseated and the fluid passed to the conduit leading to the supply tank.

Referring next to the construction shown schematically in Fig. 6 and in detail in Figs. 7, 8, 9, 10 and 11, there is illustrated the four-way fluid moving flow divider such as 56 or 58. As will be clear from Fig. 6, many features of this device are similar to those of the above described arrangement. The modifications, however, comprises, among other things, the provision of additional gears, normally the total being three sets of gears in a single housing, the arrangement consisting of a single inlet pipe 52 which is divided so that its fluid enters the gears as two streams and is again divided so that it leaves the gears as four streams. Each of these four streams is preferably supplied with a throttling valve, and the device usually incorporates a total of four throttling valves, all four throttling valves being interconnected by fluid conducting means so that the flow from each stream is metered in the correct proportion for operating the wing flaps or other instrumentalities driven by the device. Further, a modified form of throttling valve is disclosed in which use is made of ball check means and in which the synthetic seal comparable to the seal 164 shown in Fig. 3 is eliminated. This is important especially since synthetic materials are scarce and expensive at this time, and difficulty is experienced in obtaining them for the purposes herein disclosed. Further, the synthetic seals may deteriorate under certain general conditions whereas the ball check valves will not be likely so to do. Other advantages are clearly apparent.

More specifically, and still referring to Fig. 6 in particular and the schematic arrangement therein shown, the supply of fluid is brought to the device by means of the pipe 52 or the like. A portion of this fluid enters the first inlet 180, and a second portion is divided off through the inlet 182. The inlet 180 conducts the fluid into the top two sets of gears as illustrated in Fig. 6, where it is divided and one-half of it is divided between the discharge ports 184 and 186, and the other half is divided between the discharge ports 188 and 190. The fluid entering the second inlet 182 is conducted to the gears shown as the center gear and the bottom gear (on the reverse side as compared with the inlet 180) and the center and bottom gears divide this fluid so that one-half of it is discharged into the ports 184 and 186, and the other half is discharged into the ports 188 and 190. The method of the divisions of these fluids will be more clearly apparent from other figures described later.

The discharge port 184 directs the fluid through the throttle valve assembly 232. The discharge port 186 directs its fluid through the throttle valve assembly 234. The discharge port 188 directs its fluid through the throttle valve assembly 236, and the discharge port 190 directs its fluid through the throttle valve assembly 238.

The throttle valves 234 and 232 are interconnected by means of the fluid channels 242, and the throttle valves 236 and 238 are interconnected by means of the fluid moving channel 240.

The channels 240 and 242 are likewise interconnected by means of what may be termed a "by-pass" 244. The by-pass 244 may, if desired, be provided with a thermal relief 246 which may be similar to or identical with the relief arrangement described in connection with numerals 172, 174, 176 and 178 above set forth, in describing the device of Figs. 2, 3, 4 and 5.

It is understood that the arrangement of Fig. 6 is contemplated as for a single housing comprising a compact structure and has many obvious advantages in such an embodiment. The housing is illustrated generally, for schematic purposes, as housing 187.

Referring more to the actual embodiment shown in Figs. 7, 8, 9, 10, and 11, and first to Fig. 7, the housing 187 is shown as having a center plate 212, provided with gear-receiving recesses 214 and 216 into which several sets of gears are inserted. These gears comprise, in the illustration of Fig. 7, for example, the gear wheels 192 and 194 (on the shaft 204 which is journaled in said center plate), one of said gear wheels being on each side of said center plate 212; a second set of gears 196 and 198 on a splined shaft 206, said gears 196 and 198 being drivingly connected to said shaft 206 (gear 196 being on one side of said center plate 212 and gear 198 being on the other side of said center plate 212), said shaft passing through said center plate 212 and being journaled for rotation therethrough; a third set of gears 200 and 202 journaled in a manner similar to the gears 192 and 194, the gears 200 and 202 being carried by the shaft 208. The side or cover plates 218 and 220 seat over the center plate and gears, and are provided with recesses for the ends of the shafts 204, 206 and 208. The shaft 206 is preferably journaled in the bearings 210 so as to be freely rotatable with a minimum of friction. The side plates 218 and 220 form the side bushings for the outsides of the gear wheels, and the center plate 212 forms the bushing between the gear wheels and operates as a divider separating flow of the fluid entering the gear wheels.

As will be more clearly apparent from Fig. 9, the shafts 204 and 208 may be fixed to the center plate so that they do not rotate, or may be adapted to rotate, as desired. In any event, it is preferable to provide the bearings 248, for each shaft, on which the gear wheels 192, 194, 200 and 202 may freely rotate.

Referring next to Fig. 8, there is illustrated the details of the construction embodied in valves 232, 234, 236 and 238. Inasmuch as the construction is substantially identical in all of these four valves, the valve 232 will be described in detail with occasional reference to the valve 236, it being understood that the description generally, unless otherwise stated, relates to all four ball type equalizer or throttling valves.

This equalizer or throttling valve comprises an inlet chamber 250 into which the discharge part 184 discharges fluid pumped by the gear wheels 192 and 196. This inlet chamber 250 is preferably formed of a cylindrical bore in the side plate (220 in this instance), the bore being of reduced diameter at the area adjacent the end of the discharge port 184 forming an annular ledge 251. Preferably, a bushing 252 seats on a ledge portion 251, formed by reduction of the diameter of the chamber. This annular bushing 252 preferably is provided with a seal 254 which prevents the passage of fluid between the bushing and the cylinder wall.

The bushing 252 forms a valve seat as hereinafter described, and likewise forms a shoulder or seat for a bushing 253 which is preferably cylindrical in shape, and extends lengthwise the bore in the housing side plate 220 to a position preferably slightly spaced axially of the bore from the inner limit of movement of the cap 256. This bushing 253 is likewise preferably reduced reduced in outside diameter as will be apparent by the drawings, the reduced diameter being shown at 258. This reduced diameter, together with an enlarged inside diameter of the bore in the side plate 220, forms an annulus which communicates with the interior of the hollow cap 256 and forms a chamber 260. This chamber 260 in turn (in the valve arrangement of valve 232) connects to the channel 242, for the purposes above described and hereinafter more clearly pointed out. The bushing 253 likewise is provided with openings 262, near the opposite end which in turn communicate with the annulus 264, formed between the walls of the bore of the valve chamber and a reduced portion of the side wall of the bushing 253. This annulus 264 connects to the outlet 224 (see Fig. 6).

The bushing 253 likewise has a seal 266, which prevents substantial flow of fluid between the walls of the bore and the bushing 253. This bushing 253 may if desired, be an integral part of bushing 252, or may be welded or otherwise attached to bushing 252, but for convenience in manufacture and assembly is preferably separate. It has a close fit with the side walls of the longitudinal bore in the housing, and is normally stationary therein, removable only for repair and replacement.

The bushing 253 is preferably tubular, and receives the longitudinally movable valve assembly 268. This valve assembly 268 has the enlarged valve head 270, which seats on the ledge portion of the member 252. The valve 268 has a hollow bore 269, and this hollow space communicates with the openings 262, so that fluid may enter the ports 272 from said openings 262.

The enlarged head 270 of the valve 268 has an enlarged bore portion forming a seat for a valve, preferably a ball type valve 274. This ball valve 274 is ordinarily spring pressed by the spring 276 into a sealing relation with the valve seat 271 formed in the enlarged bore of the valve 270. The spring 276 in turn is held in position by means of a longitudinally extending rod like member 278. This member 278 likewise prevents the ball 274 from becoming displaced and moving out of the enlarged bore of the valve head 270. The ball 274 effectively closes the bore 269 of the valve 268 against the flow of fluid from the discharge port 184 into said bore 269 without displacement of the valve 268.

At its opposite end, the bore of the valve 268 preferably is reduced in diameter between the ball 274 and the ports 272, and with a smaller ball valve 280 which is contained in still another chamber portion 282 formed in the valve 268 by enlarging the bore 269 thereof near its end as shown in Fig. 8. This ball 280 is spring pressed against the seat formed by the restricted bore of the chamber portion 269 and normally prevents the flow of fluid from the chamber 282 into the chamber 269 below the ball 274, but permits the flow of fluid under pressure from the chamber 269 to the chamber 282. The chamber 282 is, in turn, provided with an outlet 284 in a plug portion 286, which outlet 284 communicates with the chamber 260.

In operation fluid from the discharge port 184, which usually connects to the pump, enters the chamber 250 under pressure. It will exert force on the valve 268 and unseat the valve from the annular ledge portion of the bushing 252. The fluid will flow around the valve head 270 and into the opening 262 from where it is conducted to the conduit leading to the fluid motor or device to be operated. In this respect, the device works in synchronism with the other valves in the system. In the event the device to be operated in one of the other valves, for example in valve 234, becomes overloaded, fluid pressure from the channel 242 caused by the flow of fluid in said valve 234 down past the check ball 280, will be conducted into the valve 232 and will cause the fluid under pressure to move up against the check ball 280 of the valve 232. This, in turn, will force the valve 268 into a more seated position of the bushing 252, tending to close the opening past the head 270 so that fluid in the chamber 250 will not flow past the head 270 or, if it does flow, will be in metered amounts.

It will thus be seen that the pressure existing in the ports 262 will be equalized for all of the valves in the system. An excess of pressure in the chamber 269 will thus displace the ball 280, and will balance the other valves with relation to the valve 232 in the manner above described.

In the event of reversal of flow in the device, such as occurs when the wing flaps move back to their normal position, the check ball 274 will be displaced and the fluid will flow from the ports 262 into the chamber 269 past the ball 274, into the chamber 250, where it will enter the discharge port 184 and be conducted into the system.

Referring next to the construction indicated in Fig. 12, there is provided a modification in which the driving means is indicated as a motor such as an electric motor. In this construction, the pump housing comprises a dividing wall 288, with side plates 290 and 292. Two sets of gears 294 and 296 form one gear pump, and a second set of gears 298 and 300 form a second gear pump. The gears 294 and 298 are shown as splined on a shaft 302 which forms the drive shaft for the gear pump, and which is journaled for rotation in the housing. Appropriate bushings 304 and 306 are provided in connection with the side plates 290 and 292 respectively, and roller bearings 308 and 310, assure easy rotation of the shaft 302. The shaft 302 passes through the dividing wall 288, and is extended on through a cover plate 314 on the side wall 292 in a conventional manner, the sealing ring 316 cooperating with an enlarged centering portion 318 on the shaft 302 to prevent the leakage of fluid from the housing. The shaft 302 is provided with a toothed or splined gear-like member 320 which engages a complementary socket-like portion of the drive shaft 322 of the power motor 324. This forms the driving connection for gear pumps 294, 296 and 298 and 300. The gears 296 and 300 are journaled on a shaft 326 on which they rotate. The outlets 328 and 330 carry fluid from the fluid pump of the gears 298, 300 and the gears 294, 296 respectively. Equalizer valves, such as the valves illustrated in Figs. 2 and 3 or in Fig. 8, are shown at 332 and 334.

By use of the motor driven arrangement, it is apparent that fluid from a low pressure means may be divided and equalized and used to drive a plurality of fluid motors indicated schematically in Fig. 1.

It is understood that the foregoing description is merely illustrative of a preferred embodiment of the invention and that the scope of the invention, therefore, is not to be limited thereto but is to be determined by the appended claims.

I claim:

1. In a device of the class described, the combination of a housing, a fluid inlet connection for said housing, divider means dividing said housing into two separate compartments, fluid moving gear means in each compartment, fluid connections between each said gear means and said inlet, equalizer valve means for each gear means, fluid connections from said equalizer valve means to said gear means, and a fluid connection from the equalizer valve of one gear means to the equalizer valve of the other gear means, and separate discharge outlet means for each gear means, the entire construction being located within said housing means and being compact.

2. In a device of the class described, the combination of a housing, a fluid inlet connection for said housing, divider means dividing said housing into two separate compartments, fluid moving pump means in each compartment, fluid connections between each said pump means and said inlet, equalizer valve means for each pump means, fluid connections from said equalizer valve means to said pump means, and a fluid connection from the equalizer valve of one pump means to the equalizer valve of the other pump means, separate discharge outlet means for each pump means, the entire construction being located within said housing means and being compact, and a power means drivingly connected to operate each pump means in synchronism with the other pump means.

3. A compact divider means comprising a housing, a fluid inlet in said housing, a plurality of compartments in said housing, fluid moving gear means comprising a pump in each compartment, fluid conduit means between said inlet and the gear means of each compartment, a separate fluid outlet from the gear means of each compartment, a separate throttling valve in connection with each outlet, fluid connection means between all throttling valves in said housing, all of said throttling valves, in response to variations of output pressure in any one or all of said pump outlets, restricting the output flow of each gear pump to an amount proportionate to the other gear pumps.

4. A compact divider means comprising a housing, a fluid inlet in said housing, a plurality of compartments in said housing, fluid moving gear means comprising a pump in each compartment, fluid conduit means between said inlet and the gear means of each compartment, a separate fluid outlet from the gear means of each compartment, a separate throttling valve in connection with each outlet, fluid connection means between all throttling valves in said housing, all of said throttling valves, in response to variations of output pressure in any one or all of said pump outlets, restricting the output flow of each gear pump to an amount proportionate to the other gear pumps, each of said fluid moving gear means being operatively driven in synchronism by a power means such as an electric motor.

5. In a device of the class described the combination of a housing, a single inlet means in said housing for fluid under pressure, a divider means in said housing, a three-gear pump means located on each side of said divider means, fluid connections from said inlet to two positions on each pump means, two discharge outlets for each pump means whereby means operatively connected to the pump means on each side of said divider operate in synchronism, an equalizer valve for each discharge of each pump means, connections between the equalizer valve of one outlet and the equalizer valves of the other pump outlets in said housing, whereby said pumps pump a substantially proportional amount of fluid into each discharge outlet regardless of pressure in said outlet.

6. In a device of the class described the combination of a housing, a single inlet means in said housing for fluid under pressure, a divider means in said housing, a three-gear pump means located on each side of said divider means, fluid connections from said inlet to two positions on each pump means, two discharge outlets for each pump means whereby means operatively connected to the pump means on each side of said divider operate in synchronism, an equalizer valve for each discharge of each pump means, connections between the equalizer valve of one outlet and the equalizer valves of the other pump outlets in said housing, whereby said pumps pump a substantially proportional amount of fluid into each discharge outlet regardless of pressure in said outlet, and power means comprising an electric motor driving said gear means.

7. In a compact fluid moving flow divider, a housing, inlet means introducing fluid to said housing, a divider means separating said housing into a plurality of pump chambers, a plurality of sets of gears, one gear of each set being in each chamber, said gears forming a plurality of pump means, fluid conduit means connecting said inlet to each of said pump compartments, each pump compartment having a plurality of separate discharge outlets, there being one more discharge outlet than sets of gears in said housing, and means regulating the amount of flow discharged from each outlet.

8. In a compact gear divider having a fluid inlet connection and a plurality of fluid moving gear means, those improvements which consist of combining in a single housing, divider means separating the housing into two separate compartments, a fluid moving gear set in each compartment and connections from each compartment to said inlet, an equalizer valve for each compartment, fluid connections between said equalizer valves, motor means directly connected to at least one of said gears, and a plurality of discharge outlets leading from said compartments, there being at least one more discharge outlet than sets of gears in said housing.

9. In a compact gear divider having a fluid inlet and a plurality of compartments, those improvements which consist of combining in a single housing a plurality of gear trains, one located in each compartment, a single driving means for both gear trains, which driving means comprises motor connections to one gear of each gear train whereby said gear trains are driven in synchronism, discharge outlet means providing two discharge connections for each gear train, and equalizing valve means equaling the pressure in both discharge outlets.

JOHN A. LAUCK.